(12) United States Patent
Avetisian, Sr. et al.

(10) Patent No.: US 9,291,746 B2
(45) Date of Patent: Mar. 22, 2016

(54) VISIBLE SPECTRUM ANTI-REFLECTIVE COATINGS WITH REDUCED REFLECTIONS IN ULTRAVIOLET AND INFRARED SPECTRAL BANDS

(71) Applicant: I-Coat Company, LLC, Santa Fe Springs, CA (US)

(72) Inventors: Hamlet Joe Avetisian, Sr., Pico Rivera, CA (US); Timothy George Stephan, Huntington Beach, CA (US); Arman Bernardi, Glendale, CA (US)

(73) Assignee: iCoat Company, LLC, Santa Fe Springs, CA (US)

( * ) Notice: Subject to any disclaimer, the term of this patent is extended or adjusted under 35 U.S.C. 154(b) by 0 days.

(21) Appl. No.: 14/189,736

(22) Filed: Feb. 25, 2014

(65) Prior Publication Data

US 2015/0241602 A1 Aug. 27, 2015

(51) Int. Cl.
*G02B 5/08* (2006.01)
*G02B 1/10* (2015.01)
*G02B 1/113* (2015.01)
*G02B 5/28* (2006.01)
*G02B 1/115* (2015.01)

(52) U.S. Cl.
CPC ............... *G02B 1/113* (2013.01); *G02B 1/115* (2013.01); *G02B 5/281* (2013.01); *G02B 5/283* (2013.01)

(58) Field of Classification Search
CPC .......... G02B 1/11; G02B 1/111; G02B 1/113; G02B 1/115; G02B 1/116; G02B 5/28; G02B 5/281; G02B 5/282; G02B 5/283; G02B 5/285; G02B 27/0018

USPC .................................. 359/350–361, 577–590
See application file for complete search history.

(56) References Cited

U.S. PATENT DOCUMENTS

| | | | |
|---|---|---|---|
| 5,449,413 A * | 9/1995 | Beauchamp et al. | .......... 136/257 |
| 6,250,758 B1 * | 6/2001 | Yoshihara et al. | ....... 351/159.63 |
| 6,863,397 B2 * | 3/2005 | Nakano | ...................... 351/159.6 |
| 7,452,076 B2 * | 11/2008 | De Ayguavives et al. | .......................... 351/159.65 |
| 8,534,833 B2 | 9/2013 | Cado et al. | |
| 2013/0033753 A1 * | 2/2013 | Su et al. | ........................ 359/581 |
| 2013/0038834 A1 | 2/2013 | Cado et al. | |

FOREIGN PATENT DOCUMENTS

FR 1060394 A 4/1954
WO 2012076714 A1 6/2012

OTHER PUBLICATIONS

"Radiation", Safety and Health Fact Sheet No. 2, Oct. 2003, 3 pgs.
American Optometric Association, "Why People Need Sunglasses", 2008, 2 pgs.

(Continued)

*Primary Examiner* — Thong Nguyen
(74) *Attorney, Agent, or Firm* — KPPB LLP (57) ABSTRACT

Lens coatings and coated lenses which offer full-spectrum protection by reducing back-side reflection of all light spanning from the UVB to IR-A region are provided. The full-spectrum back-side anti-reflective coatings disclosed herein are comprised of multiple thin-film layers of high refractive index (HighIndex) and low refractive index (LowIndex) materials. In many embodiments, the penultimate layer distal from the substrate lens is a HighIndex layer, and the final layer distal from the substrate lens is a LowIndex layer.

18 Claims, 8 Drawing Sheets

(56) References Cited

OTHER PUBLICATIONS

Citek, "Anti-reflective coatings reflect ultraviolet radiation", Pacific University CommonKnowledge, Mar. 1, 2008, 14 pgs.

Dobrowolski et al., "Refractive index as a variable in the numerical design of optical thin film systems", Applied Optics, Apr. 15, 1982, vol. 21, No. 8, pp. 1502-1511.

EPA, "Prevent Eye Damage—Protect Yourself from UV Radiation", 2010, 2 pgs.

Friedman, "Ultraviolet radiation and your eyes", UnitedHealthcare Vision, 2009, 2 pgs.

Kourkoumelis et al., "Eye Safety Related to New Infrared Radiation Exposure to Biometric Devices", Review, Special Issue: Biometrics Applications: Technology, Ethics, and Health Hazards, The ScientificWorldJOURNAL, 2011, vol. 11, pp. 520-528.

Larouche et al., "Step method: a new synthesis method for the design of optical filters with intermediate refractive indices", Applied Optics, Aug. 20, 2008, vol. 47, No. 24, pp. 4321-4330.

Park et al., "Design of Multilayer Antireflection Coatings", Journal of the Korean Physical Society, vol. 32, No. 5, May 1998, pp. 676-680.

Sankpill, "Infrared Radiation: Defending Against the Invisible Workplace Hazard", Protection Update, Oct. 2009, pp. 72-84.

The Vision Counsel, "Hidden Dangers of UV: Keeping Your Eyes Safe", 2011, 9 pgs.

Voke, "Occupational Vision Hazards: Infrared Radiation and the Eye", Occupational Vision Hazards, Clinical, May 9, 2008, pp. 40-43.

Voke, "Radiation Effects on the eye, Part 1—Infrared radiation effects on ocular tissue", Optometry Today, May 21, 1999, pp. 22-28.

\* cited by examiner

Example 1

| Layer # | Identity | Thickness |
|---|---|---|
| 1 | Substrate | (naked) |
| 2 | Primer | (optional) |
| 3 | Hardcoat | (optional) |
| 4 | Adhesion Layer | (optional) |
| 5 | SiO2 | 150.0nm |
| 6 | ZrO2 | 13.9nm |
| 7 | SiO2 | 32.1nm |
| 8 | ZrO2 | 64.5nm |
| 9 | SiO2 | 99.6nm |
| 10 | Hydro/Oleo phobic | (optional) |
| 11 | Air | |

Example 2

| Layer # | Identity | Thickness |
|---|---|---|
| 1 | Substrate | (naked) |
| 2 | Primer | (optional) |
| 3 | Hardcoat | (optional) |
| 4 | Adhesion Layer | (optional) |
| 5 | SiO2 | 150.0nm |
| 6 | ZrO2 | 14.3nm |
| 7 | SiO2 | 33.2nm |
| 8 | ZrO2 | 61.5nm |
| 9 | SiO2 | 101.9nm |
| 10 | Hydro/Oleo phobic | (optional) |
| 11 | Air | |

Example 3

| Layer # | Identity | Thickness |
|---|---|---|
| 1 | Substrate | (naked) |
| 2 | Primer | (optional) |
| 3 | Hardcoat | (optional) |
| 4 | Adhesion Layer | (optional) |
| 5 | SiO2 | 150.0nm |
| 6 | ZrO2 | 14.8nm |
| 7 | SiO2 | 34.3nm |
| 8 | ZrO2 | 58.6nm |
| 9 | SiO2 | 104.3nm |
| 10 | Hydro/Oleo phobic | (optional) |
| 11 | Air | |

US 9,291,746 B2

VISIBLE SPECTRUM ANTI-REFLECTIVE COATINGS WITH REDUCED REFLECTIONS IN ULTRAVIOLET AND INFRARED SPECTRAL BANDS

FIELD OF THE INVENTION

The present invention relates to lens coatings and coated lenses; and more particularly coatings and coated lenses that reduce reflectance in certain spectral bands on both sides of the visible spectrum generally known to be harmful to eye health.

BACKGROUND OF THE INVENTION

Optical coatings are thin films of material deposited in layers onto lenses for tuning their optical properties, usually light reflectance and transmission, to suit the lenses' intended purpose. The thickness and composition of these coatings, amongst other parameters, determine the resultant physical effects on the lenses' optical profile. In the eyeglass lens industry, optical coatings are applied for purposes such as anti-reflectance, scratch resistance, high-reflectance in sunglasses, ease of cleaning, anti-fog or other benefits.

A common feature in modern eyeglass lens manufacturing are anti-reflective (AR) coatings. An AR coating is typically achieved via deposition of thin layers of materials that in combination severely limit the reflection of visible light off the lens thus increasing the transmission of visible light through the lens. AR-coated lenses allow approximately 98% to as much as over 99% transmission of light through the lens, whereas some non-AR coated lenses may allow only 92% transmission of light through the lens. These coatings are popular because, in addition to improved visible light transmission, they offer numerous other benefits such as decreased surface reflections, glare, and ghost images. Currently, there are several different processes for generating lenses with such properties; each of these methods yields distinct physical properties, quality, and longevity of the end product.

SUMMARY OF THE INVENTION

The present invention relates to lens coatings and coated lenses; and more particularly coatings and coated lenses that reduce reflectance in certain spectral bands on both sides of the visible spectrum generally known to be harmful to eye health.

In some embodiments the invention is directed to an anti-reflective (AR) backside coating including:
  a plurality of thin-film layers formed of at least a high refractive index (HighIndex) material and a low refractive index (LowIndex) material, wherein the HighIndex material has a refractive index of at least 1.6 and the LowIndex material has a refractive index of no greater than 1.5;
  wherein the thin-films of HighIndex and LowIndex materials that comprise the AR coating are each at least 1 nm in thickness; and
  wherein the backside mean UV reflection factor ($R_{UV}$) of the coating measured across wavelengths 280-380 nm does not exceed 13% measured at angles of incidence 30° and 45°, and the backside IR reflection factor ($R_{IR}$) of the coating measured across 780-1400 nm does not exceed 14% measured at angles of incidence 30° or 45°.

In other embodiments the backside mean reflectance factor ($R_m$) of the coating measured across wavelengths 400-700 nm does not exceed 2.15%. In some such embodiments the backside mean reflectance factor ($R_m$) of the coating measured across wavelengths 400-700 nm does not exceed 1.65%. In still other such embodiments the backside mean reflectance factor ($R_m$) of the coating measured across wavelengths 400-700 nm does not exceed 1.15%.

In still other embodiments the backside mean UV reflection factor ($R_{UV}$) of the coating measured across wavelengths 280-380 nm does not exceed 13% measured at angles of incidence 30° and 45°, and the backside IR reflection factor ($R_{IR}$) of the coating measured across 780-1400 nm does not exceed 14% measured at an angle of incidence of 45° or does not exceed 12% measured at an angle of incidence of 30°. In some such embodiments the backside mean UV reflection factor ($R_{UV}$) of the coating measured across wavelengths 280-380 nm does not exceed 13% measured at angles of incidence 30° and 45°, and the backside IR reflection factor ($R_{IR}$) of the coating measured across 780-1400 nm does not exceed 13.5% measured at an angle of incidence of 45° or does not exceed 10% measured at an angle of incidence of 30°. In still other such embodiments the backside mean UV reflection factor ($R_{UV}$) of the coating measured across wavelengths 280-380 nm does not exceed 13% measured at angles of incidence 30° and 45°, and the backside IR reflection factor ($R_{IR}$) of the coating measured across 780-1400 nm does not exceed 13% measured at an angle of incidence of 45° or does not exceed 9.5% measured at an angle of incidence of 30°. In yet other such embodiments the coating measured across wavelengths 280-380 nm does not exceed 9% measured at angles of incidence 30° and 45°, and the backside IR reflection factor ($R_{IR}$) of the coating measured across 780-1400 nm does not exceed 14% measured at angles of incidence 30° or 45°. In still yet other such embodiments the backside mean UV reflection factor ($R_{UV}$) of the coating measured across wavelengths 280-380 nm does not exceed 9% measured at angles of incidence 30° and 45°, and the backside IR reflection factor ($R_{IR}$) of the coating measured across 780-1400 nm does not exceed 13.5% measured at an angle of incidence of 45° or does not exceed 12% measured at an angle of incidence of 30°.

In yet other embodiments, the backside mean UV reflection factor ($R_{UV}$) of the coating measured across wavelengths 280-380 nm does not exceed 5% measured at angles of incidence 30° and 45°.

In still yet other embodiments the layers form a coating stack having an innermost end configured to be disposed proximal to the backside of a substrate lens and an outermost end configured to be disposed distal to the backside of the substrate lens, and wherein the coating stack includes at least: a final layer formed from a LowIndex material and disposed at the outermost end; and a penultimate layer formed from a HighIndex material and disposed more proximal than the final layer. In some such embodiments, the coating includes a top-coat layer disposed distal to the final LowIndex layer, wherein: the topcoat is comprised of material selected from one or more of the group consisting of a hydrophobic coat and an oleophobic coat; and the top-coat has a thickness of no greater than 20 nm. In other such embodiments the AR coating further comprises at least one intermediary HighIndex layer and an intermediary LowIndex layer disposed more proximal than the penultimate layer, and wherein the intermediary HighIndex layer is more proximal than the intermediary LowIndex layer. In still other such embodiments the penultimate layer has a thickness of from 55-65 nm, and the final layer has a thickness of from 97-105 nm, and wherein the intermediary HighIndex layer has a thickness of from 13-15 nm and the intermediary LowIndex layer has a thickness of from 30-36 nm.

In still yet other embodiments, the HighIndex material is a metal oxide selected from the group consisting of oxides of Zr, Ti, Al, Y, Ta, Nd, La, Nb and PrTi or mixtures thereof; and the LowIndex material is selected from the group consisting of SiO2 and mixtures of $SiO_2$ with alumina.

In still yet other embodiments, the coating further includes one or more additional layers, wherein the additional layers are selected from the group consisting of a scratch-resistance coating, tinting, polarization, transitions and photochromatic treatment.

In still yet other embodiments, the coating further includes an electrically conductive layer disposed between the AR coating layers having a thickness no greater than 15 nm.

In other embodiments the invention is directed to an optical lens including:
  a substrate lens having a frontside and a backside;
  an AR coating disposed one of either adjacent to or distal from the backside of the substrate lens, the AR coating formed of a plurality of thin-film layers formed of at least an HighIndex material and an LowIndex material, wherein the HighIndex material has a refractive index of at least 1.6 and the LowIndex material has a refractive index of no greater than 1.5, and wherein the thin-films of HighIndex and LowIndex materials that comprise the AR coating are each at least 1 nm in thickness; and
  wherein the backside mean UV reflection factor ($R_{UV}$) of the coating measured across wavelengths 280-380 nm does not exceed 13% measured at angles of incidence 30° and 45°, and the backside IR reflection factor ($R_{IR}$) of the coating measured across 780-1400 nm does not exceed 14% measured at angles of incidence 30° or 45°.

In other embodiments the lens includes a material selected from the group consisting of glass, plastic, poly-carbonate, crown glass, Trivex™, methyl poly(methacrylate), thi(meth)acrylic (co)polymers, polyvinylbutyral, polycarbonates, polyurethanes, poly(thourethanes), polyolallylcarbonate (co) polymers), ethylene/vinyl acetate, polyesters (including PET or PBT), polyepisulfides, polyepoxides, polycarbonate/polyester copolymers, cycloolefin copolymers (including ethylene/norbornene copolymers), high-index materials, and combinations thereof.

In still other embodiments the backside mean UV reflection factor ($R_{UV}$) of the coating measured across wavelengths 280-380 nm does not exceed 13% measured at angles of incidence 30° and 45°, and the backside IR reflection factor ($R_{IR}$) of the coating measured across 780-1400 nm does not exceed 14% measured at an angle of incidence of 45° or does not exceed 12% measured at an angle of incidence of 30°. In some such embodiments the backside mean UV reflection factor ($R_{UV}$) of the coating measured across wavelengths 280-380 nm does not exceed 13% measured at angles of incidence 30° and 45°, and the backside IR reflection factor ($R_{IR}$) of the coating measured across 780-1400 nm does not exceed 13.5% measured at an angle of incidence of 45° or does not exceed 10% measured at an angle of incidence of 30°. In still other such embodiments the backside mean UV reflection factor ($R_{UV}$) of the coating measured across wavelengths 280-380 nm does not exceed 13% measured at angles of incidence 30° and 45°, and the backside IR reflection factor ($R_{IR}$) of the coating measured across 780-1400 nm does not exceed 13% measured at an angle of incidence of 45° or does not exceed 9.5% measured at an angle of incidence of 30°. In yet other such embodiments the coating measured across wavelengths 280-380 nm does not exceed 9% measured at angles of incidence 30° and 45°, and the backside IR reflection factor ($R_{IR}$) of the coating measured across 780-1400 nm does not exceed 14% measured at angles of incidence 30° or 45°. In still yet other such embodiments the backside mean UV reflection factor ($R_{UV}$) of the coating measured across wavelengths 280-380 nm does not exceed 9% measured at angles of incidence 30° and 45°, and the backside IR reflection factor ($R_{IR}$) of the coating measured across 780-1400 nm does not exceed 13.5% measured at an angle of incidence of 45° or does not exceed 12% measured at an angle of incidence of 30°.

In yet other embodiments, the backside mean UV reflection factor ($R_{UV}$) of the coating measured across wavelengths 280-380 nm does not exceed 5% measured at angles of incidence 30° and 45°.

In still yet other embodiments the backside mean reflectance factor ($R_m$) of the coating measured across wavelengths 400-700 nm does not exceed 2.15%. In some such embodiments the backside mean reflectance factor ($R_m$) of the coating measured across wavelengths 400-700 nm does not exceed 1.65%. In still other such embodiments the backside mean reflectance factor ($R_m$) of the coating measured across wavelengths 400-700 nm does not exceed 1.15%.

In still yet other embodiments the lens layers form a coating stack having an innermost end configured to be disposed proximal to the backside of a substrate lens and an outermost end configured to be disposed distal to the backside of the substrate lens, and wherein the coating stack including at least: a final layer formed from a LowIndex material and disposed at the outermost end; and a penultimate layer formed from a HighIndex material and disposed more proximal than the final layer. In some such embodiments, the lens further includes a top-coat layer disposed distal to the final LowIndex layer, wherein: the topcoat is comprised of material selected from one or more of the group consisting of a hydrophobic coat and an oleophobic coat; and the top-coat has a thickness of no greater than 20 nm. In still other such embodiments the AR coating further includes at least one intermediary HighIndex layer and an intermediary LowIndex layer disposed more proximal than the penultimate layer, and wherein the intermediary HighIndex layer is more proximal than the intermediary LowIndex layer. In yet other such embodiments the penultimate layer has a thickness of from 55-65 nm, and the final layer has a thickness of from 97-105 nm, and wherein the intermediary HighIndex layer has a thickness of from 13-15 nm and the intermediary LowIndex layer has a thickness of from 30-36 nm.

In still yet other embodiments, the HighIndex material is a metal oxide selected from the group consisting of oxides of Zr, Ti, Al, Y, Ta, Nd, La, Nb and PrTi or mixtures thereof; and the LowIndex material is selected from the group consisting of SiO2 and mixtures of $SiO_2$ with alumina.

In still yet other embodiments, the coating further includes one or more additional layers, wherein the additional layers are selected from the group consisting of a scratch-resistance coating, tinting, polarization, transitions and photochromatic treatment.

In still yet other embodiments, the coating further includes an electrically conductive layer disposed between the AR coating layers having a thickness no greater than 15 nm.

In still yet other embodiments, the AR coating is disposed on a sub-layer of $SiO_2$ having a thickness of at least 100 nm.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and data, which forms a part of this disclosure.

BRIEF DESCRIPTION OF THE DRAWINGS

The description will be more fully understood with reference to the following figures and data graphs, which are presented as exemplary embodiments of the invention and should not be construed as a complete recitation of the scope of the invention, wherein.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and data, which forms a part of this disclosure.

DETAILED DISCLOSURE OF THE INVENTION

In accordance with the attached drawings and data, coatings providing lens wearers with full spectrum eye health protection from light reflected from the back-side of eyeglass lenses are provided. In embodiments, full spectrum protection, as used herein, refers to reducing the back-side reflectance of all visible incident light similar to conventional AR coatings, while additionally reducing reflectance in the UV range (UVA and UVB bands), and also in the IR range (IR-A band) when compared to other antireflective coatings. In many embodiments back-side antireflective (AR) coatings are provided that are comprised of layered thin films of high refractive index (HighIndex) and low refractive index (LowIndex) materials. In some embodiments of the invention, the HighIndex layers are formed from a $ZrO_2$ material and the LowIndex layers are formed from a $SiO_2$ material. Further, embodiments of the invention can be combined with other coatings including sub-layers, primer layers, hardcoat layers, anti-static layers, adhesion layers, tint layers, photo-chromic layers, anti-fog layers, etc. In some embodiments, anti-reflection properties are achieved with a typical 4-layer combination of HighIndex, LowIndex, HighIndex, LowIndex layers with the final LowIndex layer furthest from the lens substrate. In many such embodiments, the antireflective coating further comprises a plurality of intermediary thin films layers between the substrate lens and the aforementioned AR coating. The intermediary layers between the substrate lens and this AR coating may be HighIndex, LowIndex, or other lens coating materials such as adhesion layers, primer layers, scratch-resistance hard coatings, tinting, polarization, anti-static, transitions or photochromatic treatments. Some embodiments of the invention may incorporate intermediate layers between the AR stack for such benefits as anti-static properties. In some embodiments of the invention, the final layer on top of the AR stack closest to lens-to-air surface may be an additional coating material to achieve hydrophobic or oleophobic properties for the final lens. In many embodiments of the invention, the back-side IR band mean reflectance does not exceed 14% and the back-side UV mean reflectance is no greater than 13%.

INTRODUCTION

The solar spectrum relevant to the current invention consists of ultraviolet radiation (UV), visible light radiation, and infrared radiation (IR). UV radiation spans wavelengths ~100-380 nanometers (nm), visible light spans ~380-780 nm, and IR radiation spans ~780 nm-1 mm. Solar UV radiation is further comprised of three primary subbands: UVC (100-280 nm), UVB (280-315 nm), and UVA (315-380 nm). Similarly, IR radiation is comprised of three main subbands: IR-A (780-1400 nm), IR-B (1400-3000 nm), and IR-C (3000 nm-1 mm).

Eye exposure to UV rays has been shown to cause injury, vision damage and eye disease. UVC rays are the highest energy but since most UVC rays are blocked by Earth's atmosphere, solar UVC does not present a great threat to ocular health. Slightly lower in energy, UVB rays can cause erythema, skin cancer and immunosuppression. Finally, UVA rays, closest to the visible light spectrum, are the lowest energy UV rays, and a number of eye disorders correlate with UVA exposure including cancers and immunosuppression. Other short- and long-term effects of UV exposure include: cancer of the eye, eyelid, and surrounding skin; cataracts; pterygium or "surfer's eye," which affects vision through corneal irritation; and melanoma of the adnexa. (See, e.g., Gallagher R., Lee T., *Progress in Biophysics and Molecular Biology* 2006, 92, 119-31; and Citek K., *Optometry* 2008, 79, 143-48, the disclosures of which are incorporated herein by reference.)

Flanking the other end of the visual light spectrum is IR radiation, which can prove just as dangerous to the lens wearer's eyes. Typically, IR waves cause molecular vibrations and rotations and raise the temperature of the tissues they penetrate; this can result in protein denaturation. Radiation from the IR-A region presents the most severe risks to ocular health. Almost all IR-A radiation hitting the eye is transmitted through the cornea to the retina. Upon reaching the retina, these waves can cause retinal burns or cataracts. Since the retinal tissues are very difficult to regenerate, retinal burns can result in vision loss. (See, e.g., Kourkoumelis N., Tzaphlidou M., *Scientific World Journal* 2011, 11, 520-28, the disclosure of which is incorporated herein by reference.)

Figure 1:
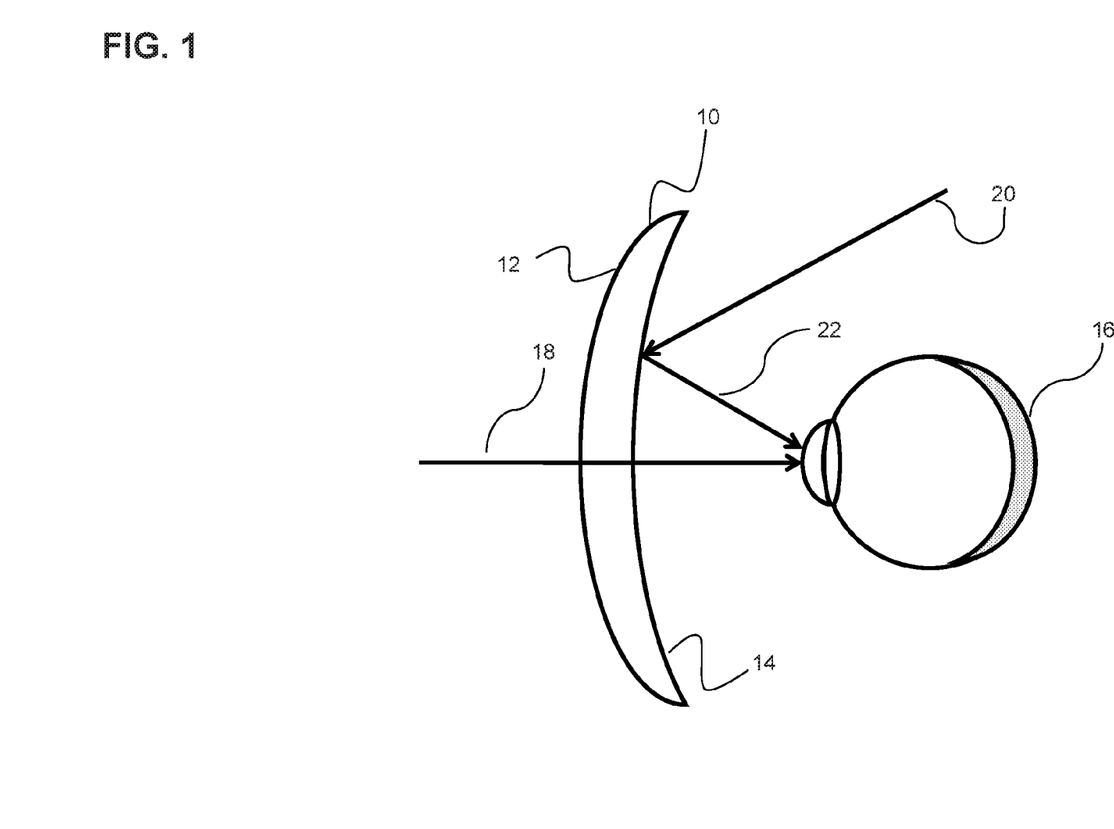
FIG. 1 provides a schematic demonstrating the back-side reflection of light from an antireflective-coated ophthalmic lens.

Referring to FIG. 1, ophthalmic lenses (10) can be conveniently divided into a front-side (12) (usually convex), and a back-face (14) (usually concave), which is positioned during use closest to the wearer's eye (16). Incoming light (18) is focused through such an ophthalmic lens onto the wearer's eye. As modeled in FIG. 1, a major disadvantage of traditionally AR coated lenses is that a significant amount of non-visible light (20) incident on the back-side of lenses can be reflected (22) directly into the wearer's eyes (16). As discussed above, exposure to this reflected light (particularly UV and IR) can be detrimental to ocular health.

Adoption of conventional front-side of lens antireflective (AR) coatings for use in back-side of lens AR coatings is commonly done, yet it is problematic. In particular, most conventional front-side AR coatings are formulated primarily to increase light transmission through the lens by reducing visible glare caused by the reflection of visible light (380 to 780 nm) from the front-side of the lens, and are not optimized for mitigating UV and IR reflections. However, light incident from behind the wearer, on the back-side of conventionally AR-coated lenses (as described above), will reflect light directly back into the wearer's eyes (see FIG. 1). (See, e.g., Citek K., *Optometry* 2008, 79, 143-48, the disclosure of which is incorporated herein by reference.) This reflection of light off the back-side of the lens is referred to herein as back-side reflectance.

To address this issue a number of attempts have been made to form AR coatings specifically designed for use on the back-side of an ophthalmic lens. However, these attempts have been limited to only portions of the reflected spectrum of light. For example, in some instances, back-side AR coatings have been formed that attempt to reduce reflections in the visible region, but have for the most part ignored reflected light in the UV region, or alternatively, have optimized AR behavior in the UV region, but only with detrimental consequences to the AR properties of the lens in the visible region. (See, e.g., EP 1174734; WO 97/28467, WO 2010/125667 and U.S. Pat. No. 4,852,974, the disclosures of each of which are incorporated herein by reference.) Even in those cases where an attempt has been made to reduce reflection properties in both UV and visible regions of lens coatings, no attempt has been made to create coatings capable of providing full-spectrum AR properties, i.e., that can provide concurrent AR protection for UV, visible and IR back-side reflection. (See, e.g., WO 2012/076714.)

Figure 2:
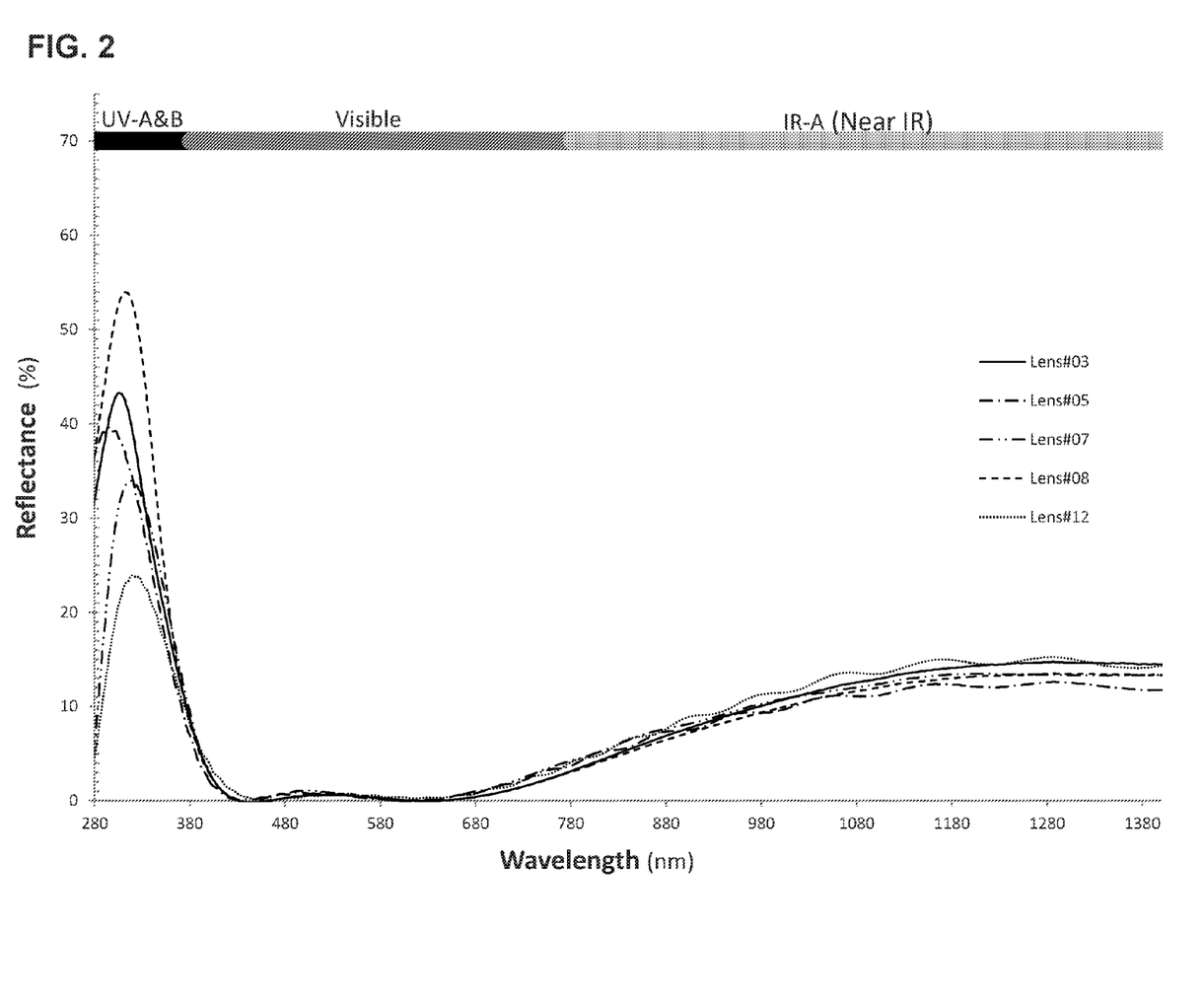
FIG. 2 provides data plots showing the full-spectrum light reflectance off the back-side of various lenses with traditional AR coatings measured at 0° angle of incidence.
Figure 3:
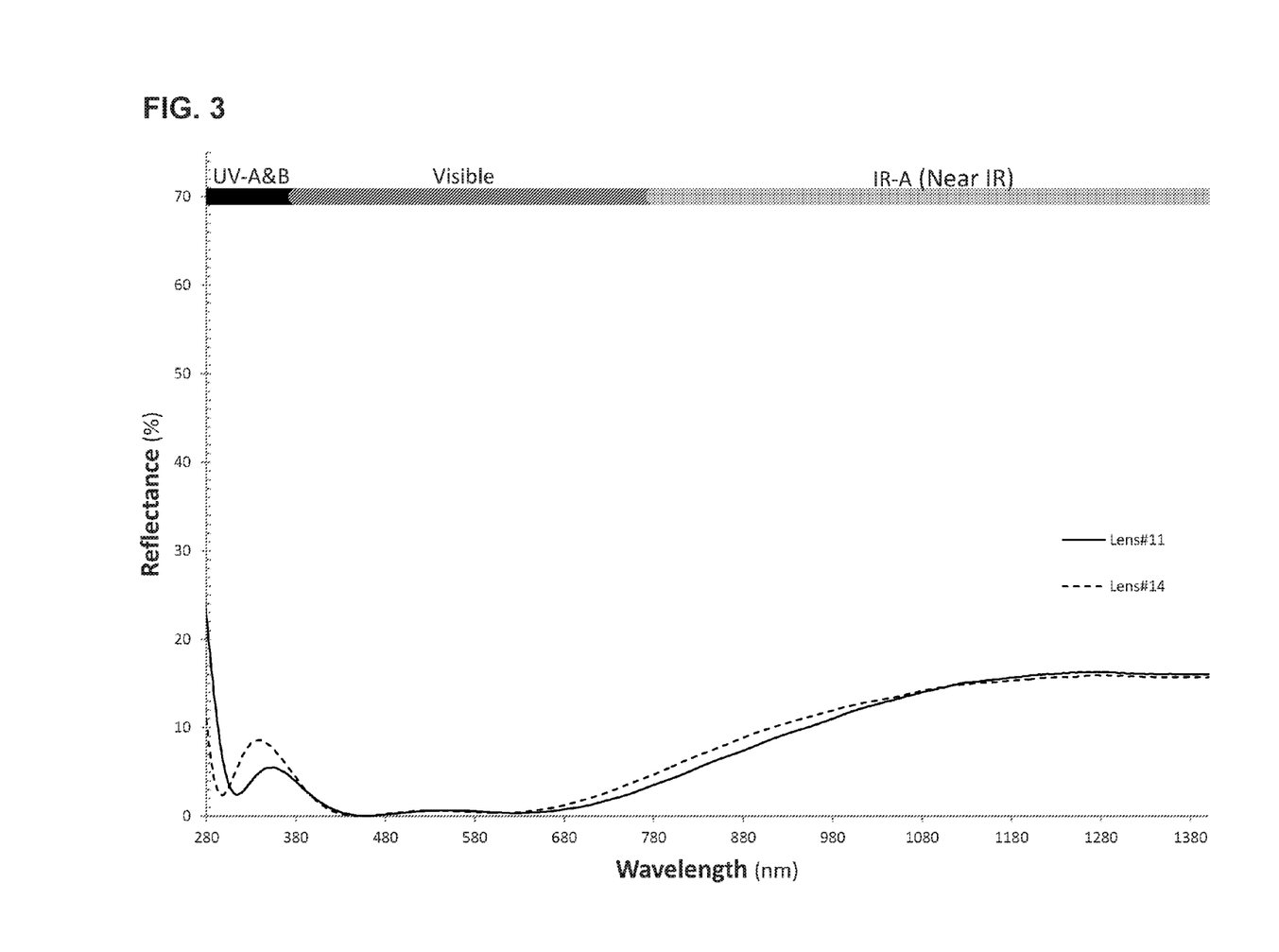
FIG. 3 provides data plots showing the full-spectrum light reflectance off the back-side of various lenses with newer AR coatings measured at 0° angle of incidence, these lenses having low UV reflectance but a high IR reflectance.
Figure 4:
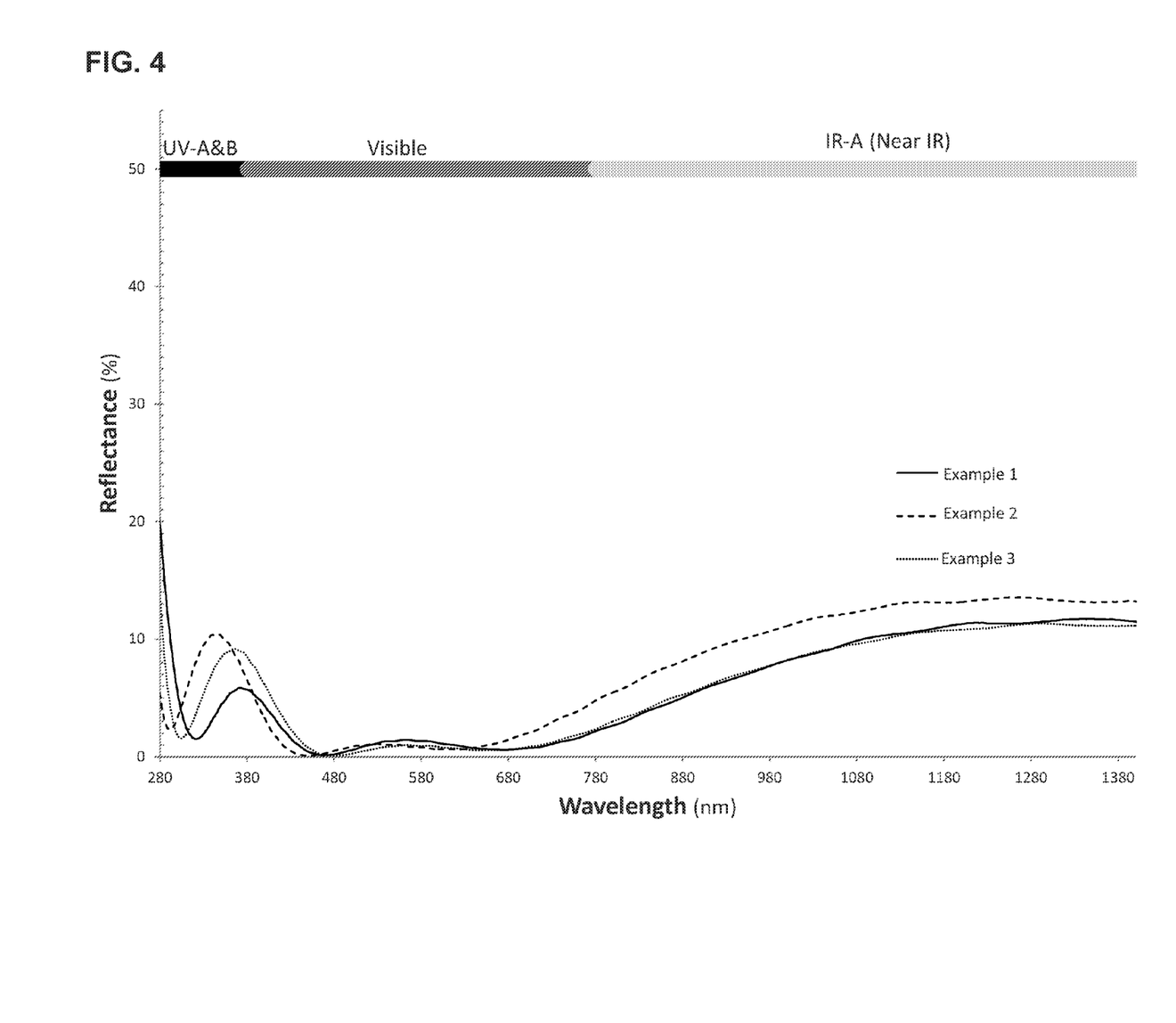
FIG. 4 provides data plots showing the full-spectrum light reflectance off the back-side of a lens in accordance with exemplary embodiments of the instant invention measured at 0° angle of incidence.
Figure 5:
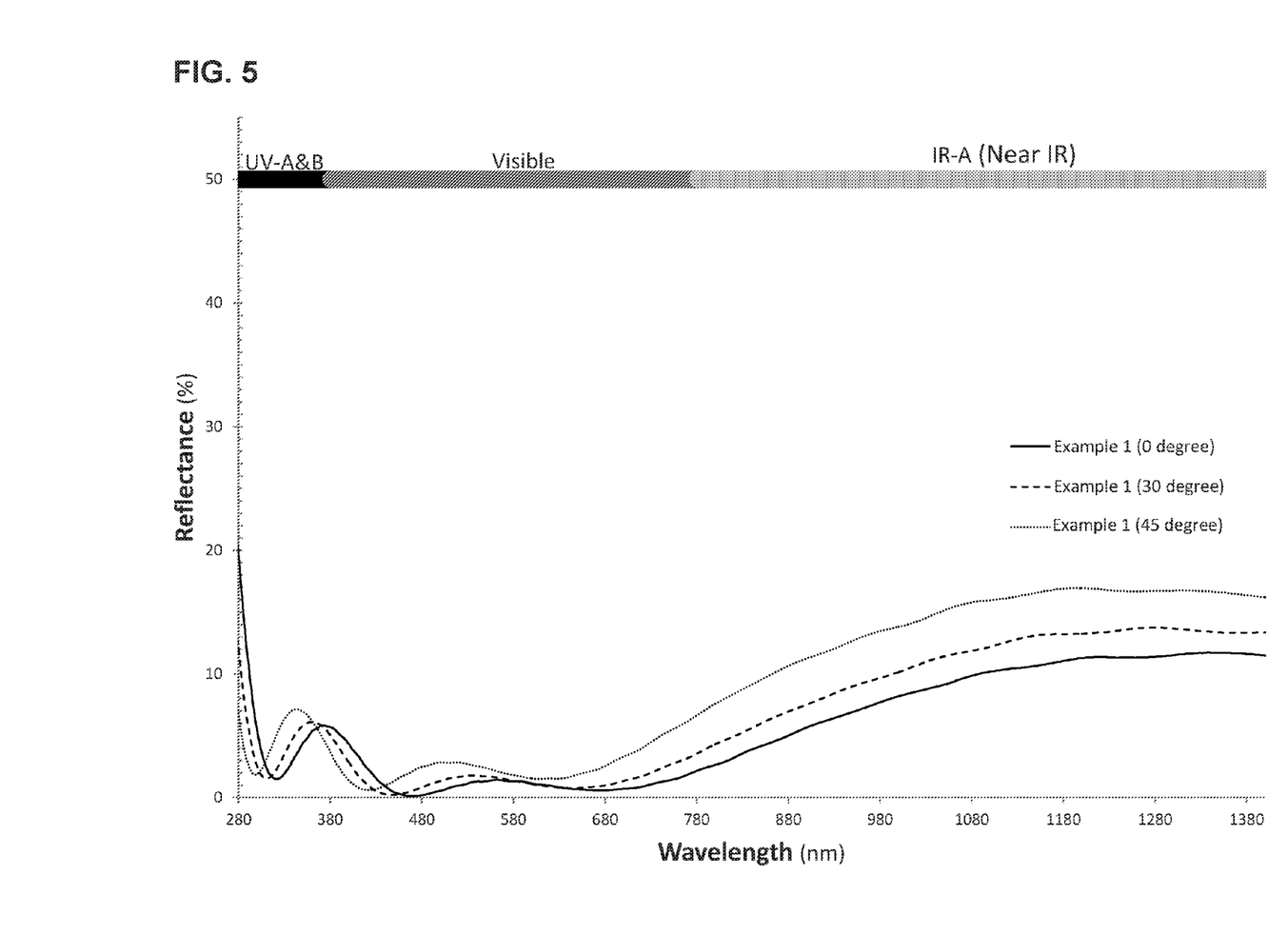
FIG. 5 provides additional data plots to FIG. 4 showing the full-spectrum light reflectance off the back-side of a lens in accordance with another exemplary embodiment of the instant invention at angles of incidence 30° and 45° in addition to 0° angle of incidence.
Figure 6:
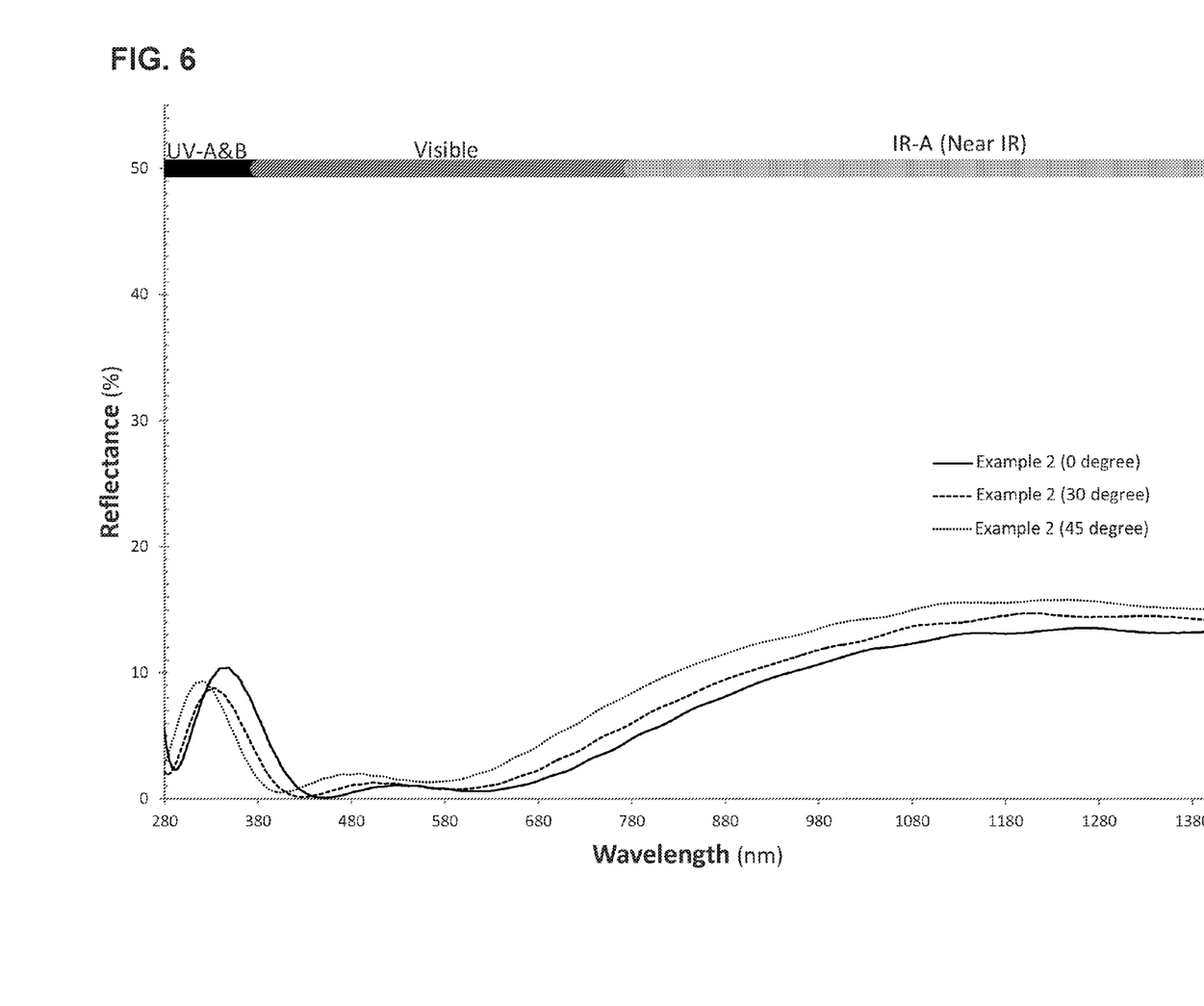
FIG. 6 provides additional data plots to FIG. 4 showing the full-spectrum light reflectance off the back-side of a lens in accordance with another exemplary embodiment of the instant invention at angles of incidence 30° and 45° in addition to 0° angle of incidence.
Figure 7:
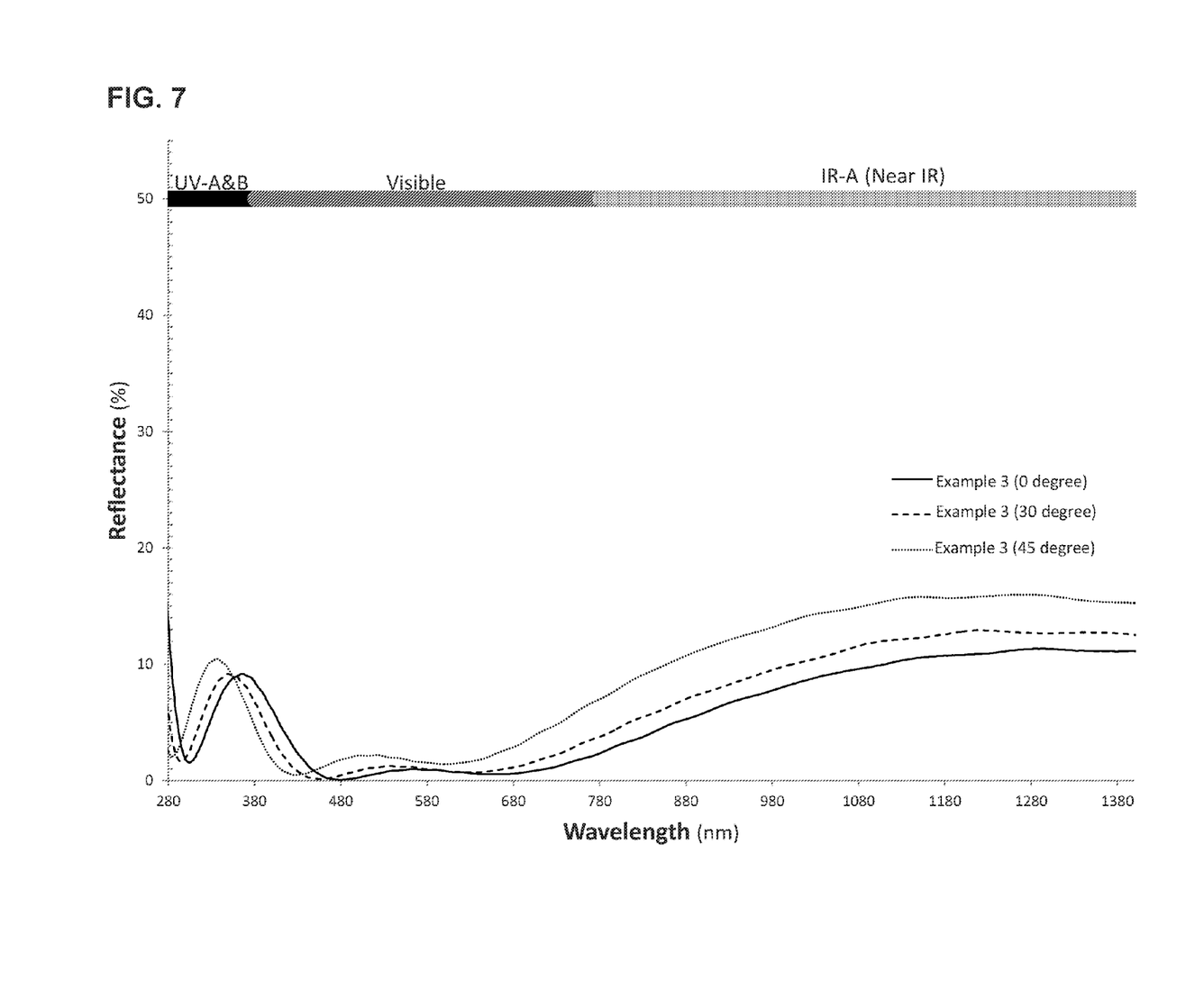
FIG. 7 provides additional data plots to FIG. 4 showing the full-spectrum light reflectance off the back-side of a lens in accordance with another exemplary embodiment of the instant invention at angles of incidence 30° and 45° in addition to 0° angle of incidence.

FIG. 2 provides the spectral reflectance profile of several lenses with conventional AR coatings, including, Kodak CleaAR™ (lens 3), Optima Resolution Poly™ (lens 5), SEIKO 1.60 Ultra Thin UV™ (lens 7), Hoya HLT150 CR39™ (lens 8), and Crizal FSV Airwear™ (lens 12). As can be seen in the figure, conventional AR coatings have relatively high reflection in the UV range, good properties in the visible range, and some of which have generally low reflections in the IR range. FIG. 3 provides the spectral reflectance profile of the newest generation AR coatings designed to address backside reflection of visible and UV light, including, Crizal UV FSV Orma Flat™ (lens 11) and Crizal UV FSV Orma Flat™ (lens 14). As can be seen in the figure, newer AR coatings have relatively low reflection in the UV range, good properties in the visible range, but have generally higher reflections in the IR range (approaching the higher IR reflection levels of conventional AR coatings shown in FIG. 2).

The embodiments below provide AR coatings capable of providing full spectrum protection, that is, reducing the reflectance of all visible incident light similar to conventional AR coatings, while additionally reducing reflectance in UVA and UVB bands, and also in the IR-A band for ophthalmic lenses.

Full-Spectrum Anti-Reflective Back-Side Lens Coatings

Anti-reflective back-side coatings for ophthalmic lenses allowing for full spectrum light reflection protection are provided.

Full-spectrum protection, as used herein, refers to the minimization of reflections from the UVB region through the IR-A band, including the visible light region in between. Reflectance (R), as used herein, refers to an appropriately computed percentage of light reflected off the back-side of the lens—the side facing the wearer as defined further below; accordingly, $R_{UV}$ indicates the percentage of back-side UV reflectance, Rm and $R_V$, indicate the percentage of visible light reflectance, and $R_{IR}$ indicates the percentage of IR reflectance. More specifically:

Rm, for the purposes of this disclosure is referred to as the "mean reflectance" noted (Rm), is such as defined in the ISO 13666:2012 Standard, and measured in accordance with the ISO 8980-4 Standard (for an angle of incidence lower than 17°, often measured at incidence angle of 0° using a contact probe), i.e. this is the (non weighted) spectral reflection average over the whole visible spectrum between 400 and 700 nm.

Rv, for the purposes of this disclosure is referred to as the "luminous reflectance" noted (Rv), is such as defined in the ISO 13666:2012 Standard, and measured in accordance with the ISO 8980-4 Standard (for an angle of incidence lower than 17°, often measured at incidence angle of 0° using a contact probe), i.e. this is the weighted spectral reflection average over the whole visible spectrum between 380 and 780 nm.

$R_{UV}$, for the purposes of this disclosure is referred to as the "mean UV reflection factor", and is defined as the mean spectral reflection between 280 and 380 nm. According to the disclosure, this factor may be measured at an angle of incidence that may range from 30° to 45°. This UV reflection factor is defined according to the ISO 13666:2012 Standard. This $R_{UV}$ may be defined through the following equation:

$$R_{UV} = \frac{\int_{280}^{380} W(\lambda)R(\lambda)\partial\lambda}{\int_{280}^{380} W(\lambda)\partial\lambda} \qquad (EQ.\ 1)$$

where $R(\lambda)$ represents the lens spectral reflection factor at a given wavelength, and $W(\lambda)$ represents a weighting function. This weighting function is the product of the solar spectrum irradiance $Es(\lambda)$, which relates to the relative amounts of different wavelengths of UVA and UVB rays emitted, and the efficiency relative spectral function $S(\lambda)$, which is the relative damage caused by UVA and UVB rays. The spectral function $W(\lambda)$, enabling calculation of the ultraviolet radiation transmission factors, is defined according to the ISO 13666:2012 Standard. The values for the functions $Es(\lambda)$ and $S(\lambda)$ will be known to those skilled in the art and can be found in ISO 13666:2012 Standard which is incorporated herein by reference.

$R_{IR}$, for the purposes of this disclosure is referred to as the "mean IR reflection factor", and is defined as the (non-weighted) spectral reflection average in the IR-A range (between 780 and 1400 nm). According to the disclosure, this factor may be measured at an angle of incidence that may range from 30° to 45° in a manner analogous to those described above.

The full-spectrum anti-reflective back-side coatings of described herein are provided such that:

- The mean reflectance (Rm) on the rear surface, that is, the (non weighted) spectral reflection average over the whole visible spectrum between 400 and 700 nm, is lower than or equal to 2.15%, in other embodiments 1.65%, and in still other embodiments less than 1.15%.
- The luminous reflectance (Rv) on the rear surface, that is, the weighted spectral reflection average over the whole visible spectrum between 380 and 780 nm, is lower than or equal to 2%, in other embodiments 1.5%, and still other embodiments 1%.
- The UV reflection factor ($R_{UV}$) on the rear face, that is the weighted reflection factor across the wavelength range of 280-380 nm, is lower than or equal to 13% for an angle of incidence 30° and 45°, and in some embodiments lower than 9%, and in other embodiments lower than 5%.
- The IR reflection factor ($R_{IR}$) on the rear face, that is, the (non-weighted) spectral reflection average across the wavelength range of 780-1400 nm, is lower than or equal to 12% for an angle of incidence 30°, or is lower than or equal to 14% for an angle of incidence 45° in some embodiments. In other embodiments the $R_{IR}$ is lower than or equal to 10% for an angle of incidence 30°, or is lower than or equal to 13.5% for an angle of incidence 45°. And in still other embodiments the $R_{IR}$ is lower than or equal to 9.5% for an angle of incidence 30°, or is lower than or equal to 13% for an angle of incidence 45°.

It should be understood that the above values generally describe the "average" or "weighted average" value across the cited range. However, as shown in FIGS. 2 to 7, reflectance within any spectral region, and indeed across the full-spectrum range, is typically described by a curved or undulating line. Accordingly, it will be understood that the majority of the spectral range may fall far below, or far above the "average or weighted average" reflection factors cited above. In addition, it will be understood that the extreme low end of the UV spectrum, that is the region of the UVB bordering the UVC spectral range (280-295 nm) may entirely or partially exceed the UV reflection factor described above. Similarly, the extreme upper end of the IR spectrum, that is the region bordering 1,400 nm, may entirely or partially exceed the IR reflection factor described above. It will be understood that coatings possessing these outlier reflection factors (within the "border regions") are contemplated within the scope of this disclosure.

Turning now to the construction of the coatings, generally the claimed AR back-side coatings are multilayered thin films comprising layers of high refractive index (HighIndex) and low refractive index (LowIndex) materials. Although any number of such HighIndex and LowIndex layers may form the AR back-side coating, it must include at least three such layers. In other embodiments there are at least four such layers, and in still other embodiments there are at least five such layers. Although certain numbers of layers are described herein, it should be understood that no maximum or minimum number of layers is proposed.

A high refractive index material (HighIndex) is a material having a refractive index higher than at least 1.6. A low refractive index material (LowIndex) is a material having a refractive index of no higher than 1.5. Materials suitable for use in the AR coating embodiments are described as follows:

- HighIndex layers included in embodiments comprise any suitable coating material having a refractive index of at least 1.6. Exemplary materials include, one or more oxides of Zr, Ti, Al, Y, Ta, Nd, La, Nb and PrTi or mixtures thereof, and/or mixtures and combinations with LowIndex materials so long as the combination has a refractive index of higher than 1.6. In many embodiments the HighIndex material is $ZrO_2$.
- LowIndex layers included in embodiments comprise any suitable coating material having a refractive index of no greater than 1.5. Exemplary materials may be comprised of $SiO_2$ or mixtures of $SiO_2$ with other materials such as alumina so long as the refractive index of the combination is no greater than 1.5.
- In many embodiments, each HighIndex layer is comprised of $ZrO_2$ and each LowIndex layer is comprised of $SiO_2$.

In some embodiments of the invention the AR coating may be disposed along with other functional coatings and layers, including, for example, primer layers, hardcoat layers, and/or adhesion layers. These layers would be disposed between the substrate lens and the first back-side AR coating layer.

It will be understood that the AR back-side coating may, in some embodiments, be deposited on a sub-layer. Such a sub-layer is usually deposited to improve the mechanical integrity of the AR coating to the substrate (i.e., resistance to damage or debonding) and is not considered part of the AR coating stack. This sub-coating may be deposited directly on the substrate or on top of another coating, such as those described below. Regardless, the sub-layer, if present, is always deposited proximal to the substrate in relation to the AR coating itself. The sub-layer should have a thickness sufficient to ensure that the mechanical integrity of the AR coating is improved. In some embodiments this requires a thickness of at least 100 nm, in other embodiments at least 150 nm. In many embodiments this sub-layer comprises a $SiO_2$ or doped $SiO_2$ layer. In addition, such a sub-layer may itself be formed of multiple layers, including layers directed to preventing reflections between the AR coating and the sub-layer at the interface thereof. Such multilayer sub-layers will be known to those skilled in the art and can be adopted with the AR coatings herein.

The primer layer in some embodiments may be deposited prior to the hardcoat layer. This layer serves to improve the impact resistance of the lens and/or the adhesion of the additional coatings to the substrate lens. This layer may be comprised of thermoplastic polyurethanes materials or combinations thereof. In many embodiments, this layer is between 0.2 and 2.5 microns thick.

The hardcoat layer in some embodiments may be an anti-abrasion and/or scratch resistant coating; these may be constructed from either a silane or acrylate polymers. In order to increase the hardness and/or refractive index of this hard coating, it may also contain one or more mineral fillers. In many embodiments, this layer may be between 2-10 microns thick.

Additionally, other layers of material such as scratch-resistance coatings, tinting, polarization, transitions and photochromatic treatments to name a few, may be deposited prior to the layers of HighIndex and LowIndex films comprising back-side coating of the claimed device.

Further, an electrically conductive layer may also be deposited in order to ensure that the lens does not retain or develop a substantial static charge. In many embodiments, the electrically conductive layer is incorporated within the AR coating stack, so long as it does not affect the optical properties of the full-spectrum back-side AR coating. In order to ensure that the properties of the AR coating remain untouched, the electrically conductive layer in many embodiments will not exceed a thickness of 15 nm. This electrically conductive layer may be comprised of a metal oxide or doped metal oxide, with the metal being indium, tin, zinc, or mixtures thereof.

Finally, the back-side coating as claimed herein can also be finished with an additional, optional hydro- or oleophobic layer. In many embodiments, this hydrophobic or oleophobic coating is no thicker than 20 nm. The optional hydrophobic layer may be comprised of a fluorosilane or fluoroazane material, with monomers featuring at least two hydrolysable functionalities.

Turning to the construction of the AR coating itself, the coating generally comprises a plurality of layers (each layer being formed of either a single material layer or combinations of sub-layers of material combined to form a layer) formed of high refractive index materials (HighIndex) and a plurality of layers (each layer being formed of either a single material layer or combinations of sub-layers of materials combined to form a layer) formed of low refractive index materials (LowIndex). Each layer of the AR coating has a thickness (expressed herein in nanometers (nm)) of at least 1 nm, such that any layer having less than this threshold thickness is not included in the count of the HighIndex and LowIndex layers forming the AR back-side coating. In many embodiments, the HighIndex and LowIndex layers of the AR coatings have thicknesses of at least 10 nm.

It should be understood that the plurality of HighIndex and LowIndex layers form a sequentially arranged stack that has an innermost end that is disposed proximal (although not necessarily adjacent to) the back-side of the lens substrate and an outermost end that is disposed distal to back-side of the lens substrate. The layers that form the stack may be arranged in any order and number so long as the outermost layers of the AR coating include one each of a HighIndex and LowIndex layer. In other words, multiple layers of HighIndex materials or multiple layers of LowIndex materials may be deposited consecutively so as to comprise a single HighIndex or LowIndex layer, respectively.

In some embodiments of the invention, the penultimate layer distal from the substrate lens is a HighIndex film comprised in some embodiments of a zirconia material, and the final layer distal from the substrate lens is a LowIndex film comprised in some embodiments of a silica material. In some embodiments, the final HighIndex layer should be of thickness from 50-70 nm, in other embodiments from 55-65 nm, and in still other embodiments from 58-65 nm while the final LowIndex layer should be of thickness from 90-110 nm, and in other embodiments from 97-105 nm, and in still other embodiments from 99-105 nm. The coating may also contain a plurality of thin film layers between the substrate lens and the penultimate HighIndex layer. The plurality of intermediary layers between the substrate lens and the aforementioned penultimate HighIndex layer may be any of the following: the LowIndex materials as described above, the HighIndex materials as described above, or any other coating material such as anti-abrasion coatings, scratch resistance coatings, transitions, photochromatic coatings, tinting, or polarizing coatings. In some embodiments there is at least one additional HighIndex layer between the penultimate HighIndex layer and the substrate, formed for example of zirconia. In many of these embodiments such an intermediary HighIndex layer may have a thickness of from 10-18 nm, in other embodiments from 11-16 nm, and in still other embodiments from 13-15 nm. In still other embodiments, there is at least one additional LowIndex layer between the penultimate layer and the substrate, formed for example of silica. In many of these embodiments such an intermediary LowIndex layer may have a thickness of from 25-40 nm, in other embodiments, from 30-36 nm, and in still other embodiments from 32-35 nm.

In other embodiments of the invention, there is a HighIndex layer, and a LowIndex layer, in that order, between the substrate lens and the above-mentioned penultimate HighIndex layer. This yields a back-side AR coating comprised of four layers of HighIndex or LowIndex materials in the following order, starting with the layer most proximal to the substrate lens: HighIndex, LowIndex, HighIndex, LowIndex. In many of these embodiments, the HighIndex layer more proximal to the substrate is between 13-15 nm thick, and the more proximal LowIndex layer is between 30-36 nm thick. Additionally, in these embodiments, the penultimate HighIndex layer is between 55-65 nm and the final LowIndex layer is between 97-105 nm, as described above. It should be understood that in other embodiments variations of layer thicknesses of the LowIndex and HighIndex material can achieve the same spectral reflectance characteristics of the current invention.

Full Spectrum Anti-Reflective Back-Side Ophthalmic Lenses

The invention is also related to an ophthalmic article incorporating these full spectrum AR back-side coatings.

For the purposes of this invention, the ophthalmic article comprises at least one lens comprising a substrate material having front and back faces or sides, where the AR coating is disposed on the back-side of the lens. As defined above, the back-side of the lens references the side of the lens or article that is proximal to the wearer's eye when the lens is in use.

With regard to the coating being "disposed on" the substrate, it will be understood that this is merely intended to reference that the coating is deposited above the relevant side or face of the substrate. Further, "disposed on" does not mean that the coating must be in contact with the relevant side or face of the substrate. More specifically, one or more intermediary coatings may be disposed or arranged between the AR back-side coating and the surface of the substrate.

Substrate materials suitable for use in ophthalmic articles may include any desirable lens material such as glass, plastic, polymeric, polycarbonate or low-index materials such as crown glass and Trivex™, high-index materials, and combinations thereof. It will be understood that the substrate may be formed into any suitable lens type, and may conform to any shape or outer configuration desired for the particular ophthalmic design.

It should be understood that the substrate may include coatings between its face or surface and the back-side AR coating. In particular, the substrate may be treated with one or more of the following coatings or treatments: abrasion-resistant layers, scratch-resistant layers, physical or chemical activating treatments, energetic bombardments (such as ion beam, electron beam, corona discharge, ion spallation, ultraviolet and/or plasma treatment), acid/basic treatments and solvent-based treatments.

The back-side AR coating may be applied to the substrate using any conventional means. Generally, one common means of depositing thin-film layers onto a substrate lens is using chemical vapor deposition. This process, which occurs under vacuum, can utilize any one or more of the following methods: electron-beam gun evaporation, thermal evaporation, ion-beam assisted evaporation, ion-beam sputtering, cathode sputtering, plasma-assisted chemical vapor deposition, etc.

It will be further understood that the front face of the optical article may be coated or treated with any coating desired, including those described above, for example, impact resistant layers, abrasion-resistant layers, scratch-resistant layers, polarizing layers, transitions, photochromic layers, tints, hydrophobic layers, oleophobic layers, anti-fog layers or AR coatings. The AR coatings used for the front face of the article may be the same as those used on the back-side or may be different. In particular, these coatings may be designed to be either of the full spectrum type described herein, or may be designed to protect against a more limited wavelength range.

Exemplary Embodiments

Figure 8:
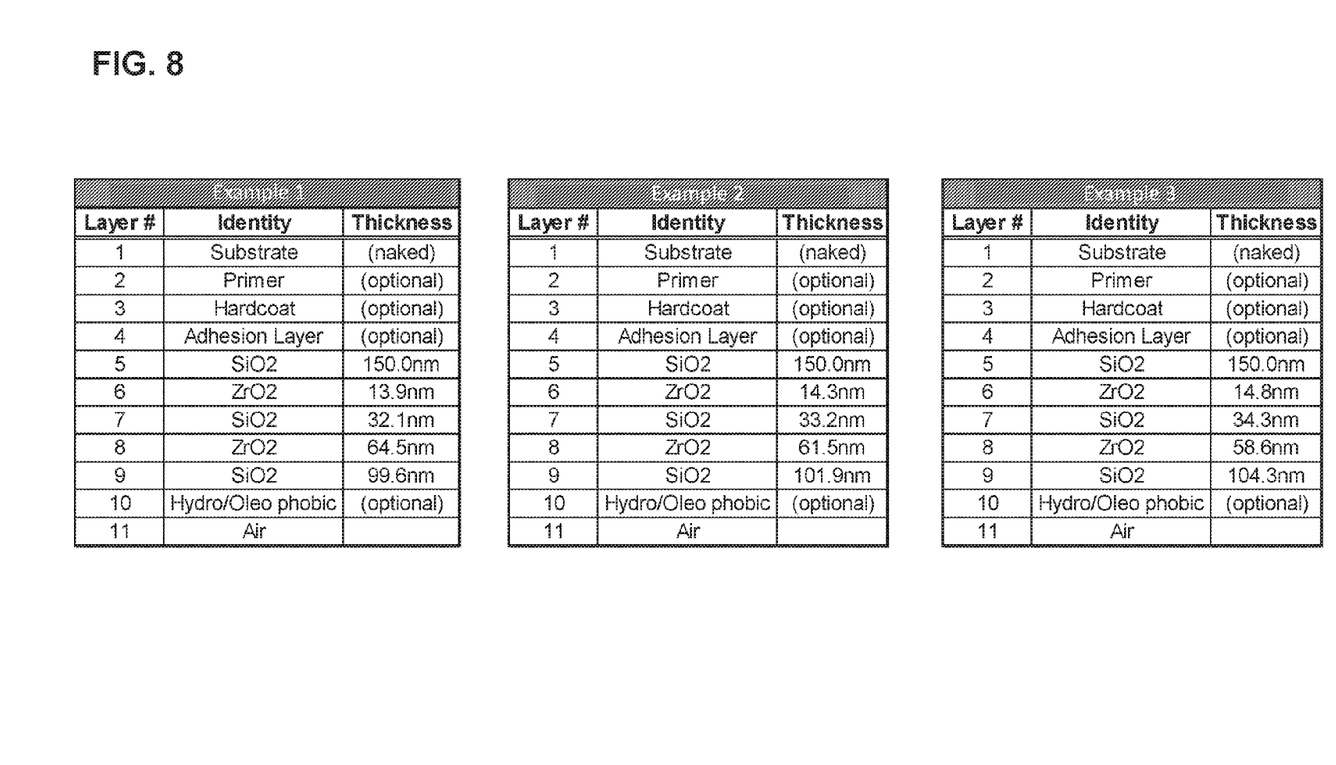
FIG. 8 provides tables of exemplary coatings in accordance with exemplary embodiments of the instant invention.

FIG. 8 provides the structural and compositional characteristics of three exemplary embodiments of the invention. These embodiments are only exemplary and illustrative in nature and are not meant to limit the scope of the invention.

In the direction moving distal from the substrate lens surface, one possible embodiment of the invention is comprised of a 150.0 nm $SiO_2$ sublayer, a HighIndex layer of $ZrO_2$ 13.9 nm thick, a LowIndex layer of $SiO_2$ 32.1 nm thick, the penultimate HighIndex layer of $ZrO_2$ 64.5 nm thick, and the final LowIndex layer of $SiO_2$ that is 99.6 nm thick. The composition of this embodiment is shown in FIG. 8, Example 1. Lenses coated with this embodiment of the invention are characterized by the reflectance profile provided in FIG. 5. As demonstrated therein, this embodiment demonstrates a mean reflection factor $R_{UV}$ of 4.61% between 280 and 380 nm at an angle of incidence of 45°, and an $R_{UV}$ of 3.29% at an angle of incidence of 30°. Further, this embodiment is characterized by an $R_{IR}$ of 13.17% between 780 and 1400 nm at an angle of incidence of 45°, and an $R_{IR}$ of 9.81% at an angle of incidence of 30°. Additionally, this embodiment has an $R_m$ value of 1.07% and an $R_v$ value of 1.11%.

In the direction moving distal from the substrate lens surface, yet another embodiment of the invention is comprised of a 150.0 nm $SiO_2$ sublayer, a HighIndex layer of $ZrO_2$ 14.3 nm thick, a LowIndex layer of $SiO_2$ 33.2 nm thick, the penultimate HighIndex layer of $ZrO_2$ 61.5 nm thick, and the final LowIndex layer of $SiO_2$ that is 101.9 nm thick. The composition of this embodiment is shown in FIG. 8, Example 2. Lenses coated with this embodiment of the invention are characterized by the reflectance profile provided in FIG. 6. As demonstrated therein, this embodiment demonstrates a mean reflection factor $R_{UV}$ of 7.41% between 280 and 380 nm at an angle of incidence of 45°, and an $R_{UV}$ of 6.83% at an angle of incidence of 30°. Further, this embodiment is characterized by an $R_{IR}$ of 13.08% between 780 and 1400 nm at an angle of incidence of 45°, and an $R_{IR}$ of 11.50% at an angle of incidence of 30°. Additionally, this embodiment has an $R_m$ value of 0.91% and an $R_v$ value of 0.86%.

In the direction moving distal from the substrate lens surface, another embodiment of the invention is comprised of a 150.0 nm $SiO_2$ sublayer, a HighIndex layer of $ZrO_2$ 14.8 nm thick, a LowIndex layer of $SiO_2$ 34.3 nm thick, the penultimate HighIndex layer of $ZrO_2$ 58.6 nm thick, and the final LowIndex layer of $SiO_2$ that is 104.3 nm thick. The composition of this embodiment is shown in FIG. 8, Example 3. Lenses coated with this embodiment of the invention are characterized by the reflectance profile provided in FIG. 7. As demonstrated therein, this embodiment demonstrates a mean reflection factor $R_{UV}$ of 7.97% between 280 and 380 nm at an angle of incidence of 45°, and an $R_{UV}$ of 5.86% at an angle of incidence of 30°. Further, this embodiment is characterized by an $R_{IR}$ that is even lower than the embodiment above, at 12.76% between 780 and 1400 nm at an angle of incidence of 45°, and an $R_{IR}$ of 9.47% at an angle of incidence of 30°. Additionally, this embodiment has an $R_m$ value of 1.06% and an $R_v$ value of 0.75%.

DOCTRINE OF EQUIVALENTS

Those skilled in the art will appreciate that the foregoing examples and descriptions of various preferred embodiments of the present invention are merely illustrative of the invention as a whole, and that variations in the steps and various components of the present invention may be made within the spirit and scope of the invention. Accordingly, the present invention is not limited to the specific embodiments described herein but, rather, is defined by the scope of the appended claims.

What is claimed is:

1. An anti-reflective (AR) backside coating comprising:
    a plurality of thin-film layers each formed of one of either a high refractive index (HighIndex) material or a low refractive index (LowIndex) material, wherein the HighIndex material has a refractive index of at least 1.6 and the LowIndex material has a refractive index of no greater than 1.5;
    wherein the thin-film layers are each at least 1 nm in thickness;
    wherein the thin-film layers form a coating stack having an innermost end configured to be disposed proximal to a backside of a substrate lens and an outermost end configured to be disposed distal to the backside of the substrate lens, and wherein the coating stack comprises at least a final layer formed from a LowIndex material having a thickness of from 97-105 nm and disposed at the outermost end, and a penultimate layer formed from a HighIndex material having a thickness of from 55-65 nm and disposed more proximal than the final layer; and
    wherein a backside mean reflectance factor (Rm) of the coating measured across wavelengths 400-700 nm does not exceed 2.15%, a backside mean UV reflection factor (RUV) of the coating measured across wavelengths 280-380 nm does not exceed 13% measured at angles of incidence 30° and 45°, and a backside IR reflection factor (RIR) of the coating measured across 780-1400 nm does not exceed 14% measured at angles of incidence 30° or 45°.

2. The coating of claim 1, wherein the coating has a set of properties selected from the group consisting of:
    the backside mean UV reflection factor (RUV) of the coating measured across wavelengths 280-380 nm does not exceed 13% measured at angles of incidence 30° and 45°, and the backside IR reflection factor (RIR) of the coating measured across 780-1400 nm does not exceed 14% measured at an angle of incidence of 45° or does not exceed 12% measured at an angle of incidence of 30°;
    the backside mean UV reflection factor (RUV) of the coating measured across wavelengths 280-380 nm does not exceed 13% measured at angles of incidence 30° and 45°, and the backside IR reflection factor (RIR) of the coating measured across 780-1400 nm does not exceed 13.5% measured at an angle of incidence of 45° or does not exceed 10% measured at an angle of incidence of 30°;
    the backside mean UV reflection factor (RUV) of the coating measured across wavelengths 280-380 nm does not exceed 13% measured at angles of incidence 30° and 45°, and the backside IR reflection factor (RIR) of the coating measured across 780-1400 nm does not exceed 13% measured at an angle of incidence of 45° or does not exceed 9.5% measured at an angle of incidence of 30°;
    the backside mean UV reflection factor (RUV) of the coating measured across wavelengths 280-380 nm does not exceed 9% measured at angles of incidence 30° and 45°, and the backside IR reflection factor (RIR) of the coating measured across 780-1400 nm does not exceed 14% measured at angles of incidence 30° or 45°;

the backside mean UV reflection factor (RUV) of the coating measured across wavelengths 280-380 nm does not exceed 9% measured at angles of incidence 30° and 45°, and the backside IR reflection factor (RIR) of the coating measured across 780-1400 nm does not exceed 13.5% measured at an angle of incidence of 45° or does not exceed 12% measured at an angle of incidence of 30°;

the backside mean UV reflection factor (RUV) of the coating measured across wavelengths 280-380 nm does not exceed 5% measured at angles of incidence 30° and 45°; and the backside mean reflectance factor (Rm) of the coating measured across wavelengths 400-700 nm does not exceed a value selected from the group consisting of 1.65% and 1.15%.

3. The coating of claim 1, further comprising a top-coat layer disposed distal to the final LowIndex layer, wherein:
the topcoat is comprised of material selected from one or more of the group consisting of a hydrophobic coat and an oleophobic coat; and
the top-coat has a thickness of no greater than 20 nm.

4. The coating of claim 1, wherein the AR backside coating further comprises at least one intermediary HighIndex layer and an intermediary LowIndex layer disposed more proximal than the penultimate layer, and wherein the intermediary HighIndex layer is more proximal than the intermediary LowIndex layer.

5. The coating of claim 4, wherein the intermediary HighIndex layer has a thickness of from 13-15 nm and the intermediary LowIndex layer has a thickness of from 30-36 nm.

6. The coating of claim 1, wherein:
the HighIndex material is a metal oxide selected from the group consisting of oxides of Zr, Ti, Al, Y, Ta, Nd, La, Nb and PrTi or mixtures thereof; and
the LowIndex material is selected from the group consisting of $SiO_2$ and mixtures of $SiO_2$ with alumina.

7. The coating of claim 1, further comprising one or more additional layers, wherein the additional layers are selected from the group consisting of a scratch-resistance coating, tinting, polarization, transitions and photochromatic treatment.

8. The coating of claim 1, further comprising an electrically conductive layer disposed between at least two of the thin-film layers of the AR coating, the electrically conductive layer having a thickness no greater than 15 nm.

9. An optical lens comprising:
a substrate lens having a frontside and a backside;
an antireflective (AR) coating disposed one of either adjacent to or distal from the backside of the substrate lens, the AR coating formed of a plurality of thin-film layers each formed of one of either a high refractive index (HighIndex) material or a low refractive index (LowIndex) material, wherein the HighIndex material has a refractive index of at least 1.6 and the LowIndex material has a refractive index of no greater than 1.5;
wherein the thin-film layers form a coating stack having an innermost end configured to be disposed proximal to the backside of the substrate lens and an outermost end configured to be disposed distal to the backside of the substrate lens, and wherein the coating stack comprises at least a final layer formed from a LowIndex material having a thickness of from 97-105 nm and disposed at the outermost end, and a penultimate layer formed from a HighIndex material having a thickness of from 55-65 nm and disposed more proximal than the final layer; and
wherein a backside mean reflectance factor (Rm) of the coating measured across wavelengths 400-700 nm does not exceed 2.15%, a backside mean UV reflection factor (RUV) of the coating measured across wavelengths 280-380 nm does not exceed 13% measured at angles of incidence 30° and 45°, and a backside IR reflection factor (RIR) of the coating measured across 780-1400 nm does not exceed 14% measured at angles of incidence 30° or 45°.

10. The lens of claim 9, wherein the substrate lens is comprised of a material selected from the group consisting of glass, plastic, poly-carbonate, crown glass, Trivex™, methyl poly(methacrylate), thi(meth)acrylic (co)polymers, polyvinylbutyral, polycarbonates, polyurethanes, poly(thourethanes), polyolallylcarbonate (co)polymers), ethylene/vinyl acetate, polyesters (including PET or PBT), polyepisulfides, polyepoxides, polycarbonate/polyester copolymers, cycloolefin copolymers (including ethylene/norbornene copolymers), high-index materials, and combinations thereof.

11. The lens of claim 9, wherein the coating has a set of properties selected from the group consisting of:
the backside mean UV reflection factor (RUV) of the coating measured across wavelengths 280-380 nm does not exceed 13% measured at angles of incidence 30° and 45°, and the backside IR reflection factor (RIR) of the coating measured across 780-1400 nm does not exceed 14% measured at an angle of incidence of 45° or does not exceed 12% measured at an angle of incidence of 30°;
the backside mean UV reflection factor (RUV) of the coating measured across wavelengths 280-380 nm does not exceed 13% measured at angles of incidence 30° and 45°, and the backside IR reflection factor (RIR) of the coating measured across 780-1400 nm does not exceed 13.5% measured at an angle of incidence of 45° or does not exceed 10% measured at an angle of incidence of 30°;
the backside mean UV reflection factor (RUV) of the coating measured across wavelengths 280-380 nm does not exceed 13% measured at angles of incidence 30° and 45°, and the backside IR reflection factor (RIR) of the coating measured across 780-1400 nm does not exceed 13% measured at an angle of incidence of 45° or does not exceed 9.5% measured at an angle of incidence of 30°;
the backside mean UV reflection factor (RUV) of the coating measured across wavelengths 280-380 nm does not exceed 9% measured at angles of incidence 30° and 45°, and the backside IR reflection factor (RIR) of the coating measured across 780-1400 nm does not exceed 14% measured at angles of incidence 30° or 45°;
the backside mean UV reflection factor (RUV) of the coating measured across wavelengths 280-380 nm does not exceed 9% measured at angles of incidence 30° and 45°, and the backside IR reflection factor (RIR) of the coating measured across 780-1400 nm does not exceed 13.5% measured at an angle of incidence of 45° or does not exceed 12% measured at an angle of incidence of 30°;
the backside mean UV reflection factor (RUV) of the coating measured across wavelengths 280-380 nm does not exceed 5% measured at angles of incidence 30° and 45°; and
the backside mean reflectance factor (Rm) of the coating measured across wavelengths 400-700 nm does not exceed a value selected from the group consisting of 1.65% and 1.15%.

12. The lens of claim 9, further comprising a top-coat layer disposed distal to the final LowIndex layer, wherein:
the topcoat is comprised of material selected from one or more of the group consisting of a hydrophobic coat and an oleophobic coat; and
the top-coat has a thickness of no greater than 20 nm.

13. The lens of claim 9, wherein the AR coating further comprises at least one intermediary HighIndex layer and an intermediary LowIndex layer disposed more proximal than the penultimate layer, and wherein the intermediary HighIndex layer is more proximal than the intermediary LowIndex layer.

14. The lens of claim 13, wherein the intermediary HighIndex layer has a thickness of from 13-15 nm and the intermediary LowIndex layer has a thickness of from 30-36 nm.

15. The lens of claim 9, wherein:
the HighIndex material is a metal oxide selected from the group consisting of oxides of Zr, Ti, Al, Y, Ta, Nd, La, Nb and PrTi or mixtures thereof; and
the LowIndex material is selected from the group consisting of $SiO_2$ and mixtures of $SiO_2$ with alumina.

16. The lens of claim 9, wherein the AR coating is disposed on a sub-layer of $SiO_2$ having a thickness of at least 100 nm.

17. The lens of claim 9, further comprising one or more additional layers, wherein the additional layers are selected from the group consisting of a scratch-resistance coating, tinting, polarization, transitions and photochromatic treatment.

18. The lens of claim 9, further comprising an electrically conductive layer disposed between at least two of the thin-film layers of the AR coating, the electrically conductive layer having a thickness no greater than 15 nm.

* * * * *